US00RE34968E

United States Patent [19]

Afshar et al.

[11] E Patent Number: Re. 34,968

[45] Reissued Date of Patent: Jun. 13, 1995

[54] HANDSET OR SPEAKER MESSAGE RETRIEVAL SYSTEM

[75] Inventors: Eskandar Afshar, Lomita; Mark Karnowski, Garden Grove, both of Calif.

[73] Assignee: PhoneMate, Inc., Torrance, Calif.

[21] Appl. No.: 67,560

[22] Filed: May 25, 1993

Related U.S. Patent Documents

Reissue of:

[64] Patent No.: 5,111,500
Issued: May 5, 1992
Appl. No.: 461,068
Filed: Jan. 4, 1990

[51] Int. Cl.[6] ..... H04M 1/64

[52] U.S. Cl. ..... 379/67; 379/82

[58] Field of Search ..... 379/82, 79, 70, 67, 379/88

[56] References Cited

U.S. PATENT DOCUMENTS

| | | | |
|---|---|---|---|
| 3,833,186 | 9/1974 | Catto et al. | 379/79 X |
| 4,032,712 | 6/1977 | Catto et al. | 379/76 |
| 4,503,288 | 3/1985 | Kessler | 379/67 |
| 4,689,813 | 8/1987 | Pleska et al. | 379/80 |
| 4,932,048 | 6/1990 | Kenmochi et al. | 379/67 |

FOREIGN PATENT DOCUMENTS

| | | | |
|---|---|---|---|
| 0141648 | 11/1981 | Japan | 379/70 |

*Primary Examiner*—Thomas W. Brown
*Attorney, Agent, or Firm*—Frishauf, Holtz, Goodman & Woodward

[57] ABSTRACT

A telephone answering machine with a built in telephone that incorporates a mechanism for retrieving messages under a variety of operating conditions has the ability to access messages through the telephone handset to ensure privacy, while not interfering with normal telephone usage. The messages can also be played back through the speaker of the unit.

17 Claims, 2 Drawing Sheets

STATE DIAGRAM

HANDSET OR SPEAKER MESSAGE RETRIEVAL SYSTEM

Matter enclosed in heavy brackets [ ] appears in the original patent but forms no part of this reissue specification; matter printed in italics indicates the additions made by reissue.

BACKGROUND

In the existing telephone answering machines, if the user wishes to listen to the messages through the handset, he must manually operate a botton or a switch. A significant disadvantage of this feature is that if the switch is inadvertently left in the handset playback mode, anyone who is unfamiliar with the switching mechanism will not be able to respond to the incoming calls. Additionally, existing telephone answering machines cannot handle the transitions of the message playback from the speaker to handset automatically, without user-intervention.

In the patent to D'Agosto III et al., U.S. Pat. No. 4,790,002 a telephone answering machine has a telephone/speaker phone combination that allows a separate Record/Playback Module. The device forms a unit having a telephone answering machine and dictation machine. The patent discusses the use of the handset for recording messages, but there is no mention of the use of the handset in play back.

The patent to Shapiro et al., U.S. Pat. No. 4,760,593 is described a personal alarm system which incorporates a speaker phone so as to permit hands free operation and remote activation via a switch on a hand held unit. It will react differently to the switch depending on whether or not the line is ringing. The following passages explain this aspect of the invention in more detail:

> In the event of subscriber inactivity, or in the event a subscriber activates a "help button" to indicate assistance is required, the subscriber station transmits an alarm message containing subscriber identification information over a communications link to the central monitoring station. (Column 1, lines 46–51)

In the speaker phone disabled state, the telephone may be answered by the subscriber in the conventional manner by lifting the telephone handset or, as explained below, by activating a "help button" while the phone is ringing . . . . Upon the occurrence of these concurrent events, the subscriber station produces a speaker phone off hook condition, and activates the speaker phone so as to permit the calling party and the subscriber to converse without the need for the subscriber to lift the telephone handset. (Column 3, lines 8–29) Although this device switches during message playback, it uses it for a purpose completely different from that of the present invention.

GTE Model 6010—This product is a telephone answering machine that uses a manual switch to allow the user to listen to messages over the handset. Our invention provides substantial improvement over this product by performing the switching automatically.

SUMMARY OF THE PRESENT INVENTION

When the user presses the PLAY button, the message playback will be started. If the user has already picked up the handset, the audio signal will be routed to the handset earpiece. If the handset has not been picked up, the messages will be broadcast through the answering machine's speaker. If the user then picks up the handset, the unit will automatically switch to handset playback mode.

Another important feature of the present invention is its ability to handle incoming calls and interruptions from custom calling features any time during the message playback in either the handset or the speaker modes. If a call comes in during speaker playback, the user can answer the call by simply picking up the handset. Should a call arrive during handset playback, just pressing the FLASH button will cause the telephone to be connected on line and the tape play back will stop.

In addition, if the user wishes to control his return to the exact same portion of the message he was listening to before being interrupted by the call, he can do so by pressing the PAUSE button before answering the call. When the incoming call is completed, pressing the PAUSE button again will result in the continuation of message playback. This is a very convenient feature because it allows the user to receive or place calls without having to start over and listen to all the previous messages right from the beginning.

A principal advantage of message retrieval through the handset is privacy. This is particularly true in an "open office" environment, where employees are separated only by room dividers. Message playback on a speaker can be heard by any other office worker who happens to be within earshot. This can cause problems when messages contain private or confidential information.

Unlike manually-switched products, the present invention will not cause problems with regular telephone operation. It is not necessary for the user to ensure that the switch is in the proper position to be able to use the telephone.

Due to the automatic nature of the invention, the switching function can incorporate intelligence that allows the device to think along with the user. For example, if the phone rings during message playback, lifting the handset will connect the user to the phone line, instead of starting handset playback.

This intelligent operation allows the invention to provide the necessary privacy function, while remaining transparent to the user.

OBJECTS OF THE INVENTION

It is an object of the present invention to provide telephone message retrieval system that is more convenient.

It is an object of the present invention to provide telephone message retrieval system that is easier to use.

It is an object of the present invention to provide telephone message retrieval system that provides privacy.

It is an object of the present invention to provide telephone message retrieval system that saves time in operation.

These and other objects of the present invention will become apparent from a review of the accompanying drawings and the following specifications.

DETAILED DESCRIPTION OF THE DRAWINGS

Figure 1:
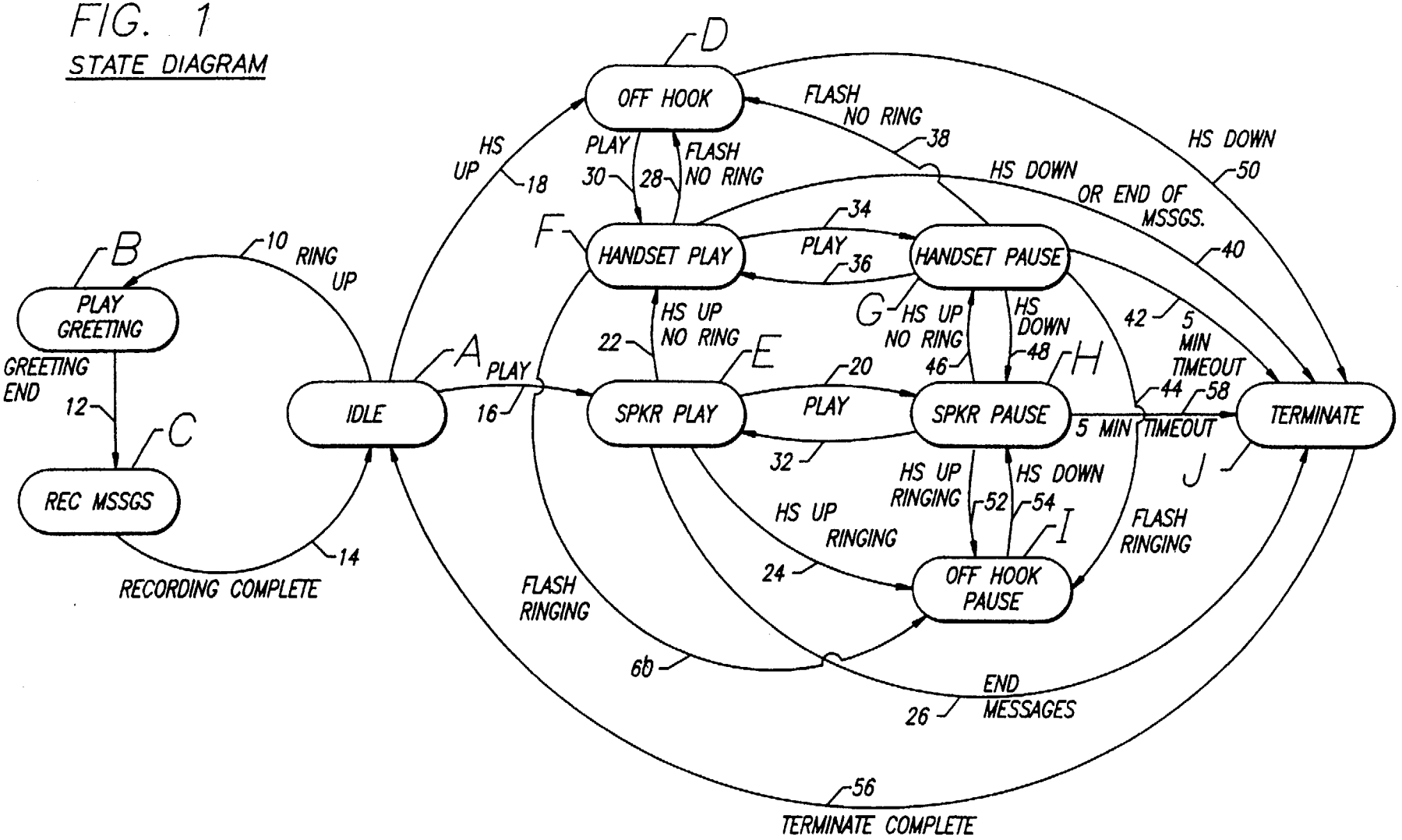
FIG. 1 is a flow chart of the functions of the logic of the present invention.

FIG. 1 is a flow chart of the states that the answering machine of the present invention could be in. The transitions between the states are represented by the arrows. These transitions could be initiated by the user or by the occurrence of certain conditions.

The normal message-taking cycle is as follows: During the IDLE mode A of the telephone answering machine, if there is an incoming call and if the handset is not picked up within a predetermined number of rings 10, the machine plays a greeting B and prompts the user to leave a message when the greeting ends 12. After the message is recorded C, the machine goes back 14 into the idle mode. The mechanisms for detecting the calling party's line disconnect and the vox disconnect, as well as the standard operating features of a telephone answering machine are well known and will not be discussed here.

The primary emphasis of our invention is on allowing the user to have the capability of privately hearing his messages through the telephone handset and to do so automatically without being inconvenienced by combersome manual operations. The algorithm is designed to "think along" with the user by responding to the inputs in a logical and natural manner.

From the user's standpoint, the telephone answering unit incorporating the present invention will operate just like a regular telephone. Therein lies its "user-friendliness". If the handset is picked up 18 in response to a call or with an intention of either initiating a call or listening to recorded messages in privacy, the telephone answering machine goes into the OFFHOOK mode D. If the handset is put back on the base 50, it goes into TERMINATE mode J and after the termination is complete 56, goes into the idle mode. This is the termination sequence.

The user has a choice of playing back messages through the handset or through the speaker. In the Offhook mode, if the user initiates Message Play 30, the system goes into the HANDSET PLAY mode F. The user is able to listen to messages through the earpiece of the handset, ensuring privacy. If for any reason, the user wishes to stop the playback of messages through the Handset, he can do so by activating the 'play' key 34. The system then goes into the HANDSET PAUSE mode G. Activating the 'play' key 36 in the Handset Pause mode reverts the system back to the Handset Play mode. If the system remains in the Handset Pause mode for more than five minutes 42, the system returns to the Idle Mode through the termination sequence.

If the 'Play' key is activated in the Idle mode without lifting the handset 16, the system goes into SPEAKER PLAY mode E. The recorded messages can be heard through the speaker. If the user wishes to listen to the messages in privacy, merely lifting the handset 22 would automatically cause the messages to be played through the handset ear piece. Activating the 'Play' key in the Speaker Play mode 20 would cause SPEAKER PAUSE H and vice versa 32. If the 'End of messages' is reached 26 in the Speaker Play mode, it terminates.

The invention also allows for logical handling of incoming calls during message playback. While in Speaker Play or Speaker Pause, if the handset is lifted in response to an incoming call 24 or 52, the system goes into OFFHOOK PAUSE mode I. This allows the user to take the call while maintaining the position of the message tape. This mechanism will ensure that the user returns to the exact point he was previously in and can hear the remainder of the messages. The system always goes back into Speaker Pause mode upon replacing the handset 54. However, if the handset is then lifted while there is no incoming call 46, the system goes into Handset Pause. Replacing the handset 48 would revert it to Speaker Pause. If the system remains in the Speaker Pause mode for more than five minutes 58, it returns to the Idle mode through the termination sequence.

If there is an incoming call during the Handset Pause mode, generating a hook flash 44 either by toggling the hook switch or by activating a flash key would take it to the Offhook Pause mode. In the Handset Play mode, if the hook flash is activated during an incoming call 60, the system also goes into the Offhook Pause *mode I. If there* is no incoming call, activating the hook flash 28, 38, causes the system to go into Offhook mode from both Handset Play and Handset Pause modes. Also, if the handset is put back on the base unit or if the 'End of messages' signal is detected 40, the Handset Play mode gets terminated.

Figure 2:
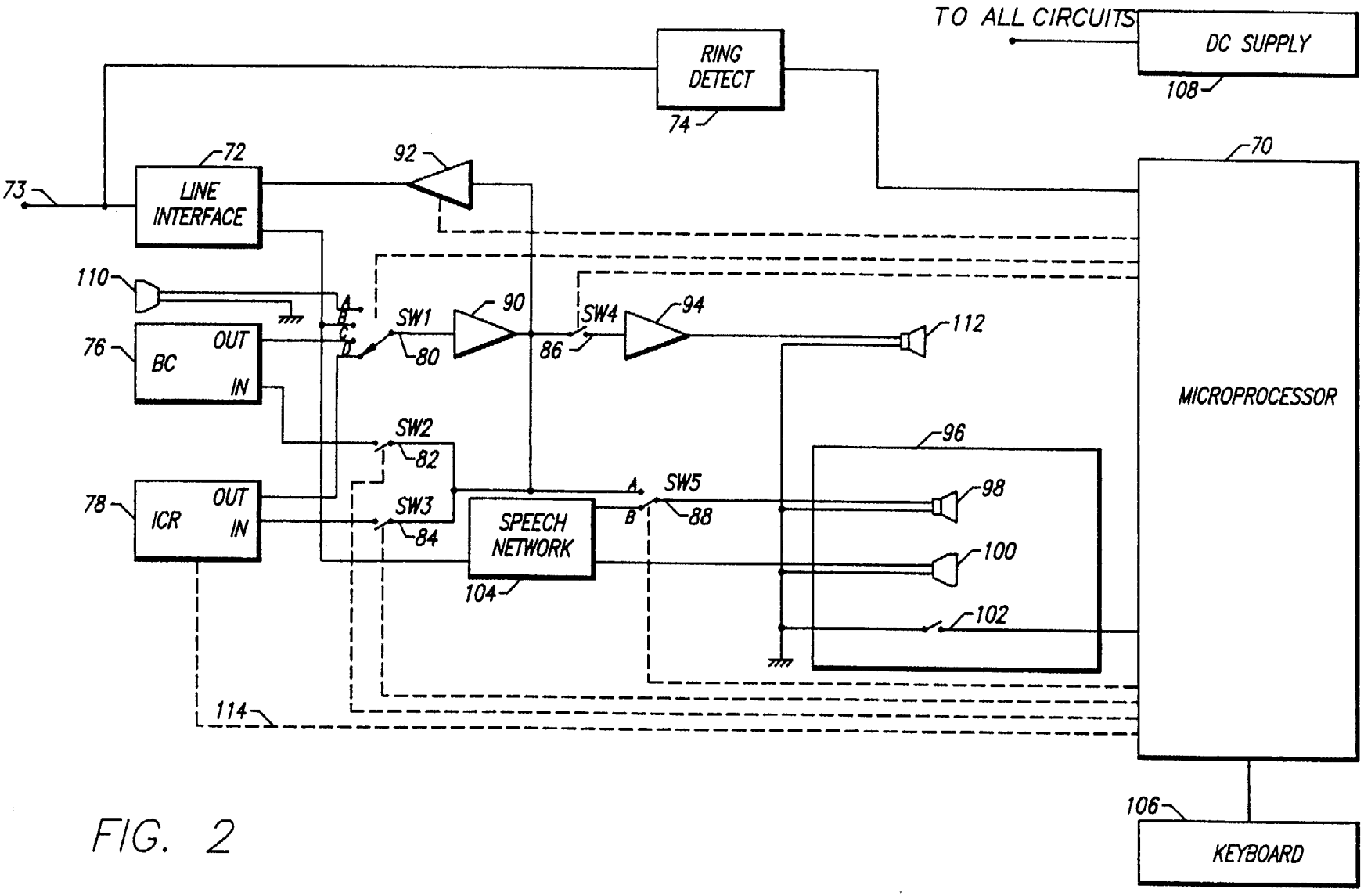
FIG. 2 is a circuit diagram of the present invention.

FIG. 2 shows a block diagram of a typical implementation of the invention. It consists of a number of blocks of conventional circuitry, which are described as follows:

A Microprocessor 70, which provides general control of the unit;

A Line Interface 72, which couples the audio signal from the telephone line 73 to the audio circuitry of the answering machine;

A Ring Detect circuit 74, which detects the ring signal of the telephone line, and provides the microprocessor with a logic level signal corresponding to the incoming ring:

An Outgoing Message block BC *76*, delivers a greeting to the caller, prompting him to leave a message;

An Incoming Message block IC[C]R *78*, which records the caller's message through its In terminal and plays back the message through its Out terminal;

Switches SW1–SW5, *80, 82, 84, 86, 88,* which are controlled by the microprocessor to provide a path for the audio signals that correspond to the operative state of the machine;

A Preamp 90, which amplifies the tape or line audio signal, in preparation for playback or record;

A Line Amp 92, which is controlled by the microprocessor to send the output signal of the Preamp to the telephone line;

A Speaker Amp 94, which amplifies the audio signal so that it can be played back through the speaker;

A Telephone Handset 96, which has a built-in speaker 98 and microphone 100, in addition to a hook switch 102 that is actuated when the handset 96 is lifted off the cradle;

A Speech Network 104, which performs the necessary two to four wire conversion from the telephone line to the handset;

A Keyboard 106, connected to the microprocessor, which allows the user to manually operate the unit; and A DC Power Supply 108 that provides electrical power to the above-mentioned circuitry.

The following is the manner in which the microprocessor 70, controls this circuitry in order to perform various answering machine functions.

To allow the user to record the out going message, SW1 is placed in the A position, and SW 2 is closed. This couples the audio signal from the microphone 110 to the input of the outgoing message 76 via the preamp 90.

If the user wishes to engage normal telephone operation, he may do so be simply lifting the hook switch 102. The microprocessor 70, senses this action, and connects the handset 96 to the line 73 by placing SW5 in the B position.

When the microprocessor 70 has detected a predetermined number of rings from the Ring Detect Circuit 74, it will seize the telephone line 73 and deliver the outgoing message to the telephone line 73 by placing SW1 in the C position and enabling the line amp 92. When the Outgoing Message is complete, the microprocessor 70, starts recording the incoming message by setting SW1 to the B position and closing SW3.

After one or more incoming messages have been recorded, the user can initiate playback by pressing a key on the keyboard 106. The microprocessor 70 will then put SW1 in the D position and close SW4, which will cause the outgoing messages to be played over the speaker 112. If the user picks up the Handset 96 (activating the hook switch 102), the microprocessor 70 can switch to the handset playback mode by opening SW4 and placing SW5 in the A position.

The microprocessor 70 also suspends the Incoming Message block ICR by signalling it via a control line 114. When the user sets the handset 96 down, the microprocessor 70 goes through its terminate sequence 40 (FIG. 1). In a like manner, the microprocessor 70 controls the operation of the unit so that it functions according to the state diagram of FIG. 1.

In addition to the normal components of a integrated telephone/TAD, the invention incorporates switching means to connect the telephone handset's speaker 98 to either the telephone audio circuit or the tape amplifier. This switching could be accomplished by means of a relay, an analog switch, or even a transistor.

In some models, it is necessary to electrically isolate the telephone handset's 96 circuit [form] *from* the tape circuit. This is necessary to avoid a potential shock hazard because the telephone line can carry high voltages relative to ground. This isolation can be accomplished by connecting the tape audio to the handset via an audio transformer.

While the invention has been described with regards to the preferred embodiment, it is possible that variations may be devised which do not depart from the inventive concept herein, and are intended to be construed within the scope of this invention.

What is claimed is:

1. A telephone answering machine having a telephone portion for communication between called and calling parties and an answering portion for message recording and playback, said telephone answering machine comprising:

a telephone handset;

message storage means for storing a message from a caller and playing back said message to said called party, said message storage means coupled to said telephone handset;

a speaker coupled to said message storage means, said speaker, *when message playback is initiated and with said telephone handset being on hook,* audibly broadcasting a recorded message from said message storage means;

switching means coupled to said telephone handset, said switching means switchably selecting either said telephone handset or said speaker for audible broadcast of a recorded message from said message storage means; and control means coupled to said message storage means, said control means suspending and activating operation of said message storage means in response to coincident use of said telephone handset, thereby preserving message transmission order from said message storage means.

2. The telephone answering machine of claim 1 in which said switching means switches output of said message storage means to said telephone handset when said telephone handset is [absent from said telephone answering machine] *off hook.*

3. The telephone answering machine of claim 1 in which said switching means switches output of said message storage means to said speaker when said handset is [present upon said telephone answering machine] *placed on hook.*

*4. A telephone answering machine having (a) a telephone portion including a telephone handset with means for communication between called and calling parties when the handset is off hook, (b) an answering portion including means for message recording and playback, and (c) speaker means to audibly reproduce a recorded message being played back on said message recording and playback means, comprising:*

*switching means for selectively coupling the message recording and playback means to either said telephone handset or said speaker means at any given time and, when the handset is on hook, being set to couple the message recording and playback means to said speaker means upon initiation of message playback; and*

*control means to, after the handset has been taken off hook, automatically change over the switching means so as to couple the message recording and playback means to said handset.*

*5. The telephone answering machine of claim 4, wherein if said message recording and playback means is in an idle state when the handset is taken off-hook, said control means automatically actuates said switching means to couple the message recording and playback means to said handset for, upon such playback being initiated, audibly reproducing the recorded message therethrough.*

*6. The telephone answering machine of claim 4, wherein if audible reproduction by the speaker means of a message recorded by said message recording and playback means is in progress when said handset is taken off hook, said control means automatically changes over the switching means to continue such audible reproduction on said handset.*

*7. The telephone answering machine of claim 4, wherein said control means responds to said handset being placed on hook while said message recording and playback means is coupled to the handset by changing over the switching means to couple said message recording and playback means to said speaker means.*

*8. A telephone answering machine connected to a telephone line and having (a) a telephone portion including a telephone handset with means for communication between called and calling parties when the handset is off hook, (b) an answering portion including means for message recording and playback, and (c) speaker means to audibly reproduce a recorded message being played back on said message recording and playback means, comprising:*

*switching means for (a) selectively coupling the message recording and playback means to either one of said telephone handset and said speaker means at any*

*given time and (b) coupling the handset to the telephone line;*

*ring detect means for sensing an incoming ring on said telephone line and for generating a ring detect signal in response thereto; and*

*control means for, when audible reproduction by the speaker means of a message recorded by said message recording and playback means is in progress, responding to the handset being taken off hook after occurrence of said ring detect signal to automatically actuate the switching means so as to couple the handset to the telephone line.*

*9. The telephone answering machine of claim 8, wherein said control means stops further playback of the recorded message when the switching means is actuated in response to said ring detect signal and the handset being taken off hook.*

*10. The telephone answering machine of claim 9, wherein said control means pauses said message recording and playback means at that point where message playback was stopped to enable subsequent continuation of playback from such point.*

*11. A telephone answering machine connected to a telephone line and having (a) a telephone portion including a telephone handset with means for communication between called and calling parties when the handset is off hook, (b) an answering portion including means for message recording and playback, and (c) speaker means to audibly reproduce a recorded message on said message recording and playback means, comprising:*

*switching means for (a) coupling the message recording and playback means to either one of said telephone handset and said speaker means to any given time, and (b) coupling the handset to the telephone line;*

*ring detect means for sensing an incoming ring on said telephone line and for generating a ring detect signal in response thereto; and*

*control means for, when audible reproduction by the handset of a message recorded by said message recording and playback means is in progress, responding to said ring signal and a flashing signal to actuate the switching means so as to couple the handset to the telephone line.*

*12. The telephone answering machine of claim 11, wherein said control means stops further playback of the recorded message when the switching means is actuated in response to said ring detect signal and said flashing signal.*

*13. The telephone answering machine of claim 12, wherein said control means pauses said message recording and playback means at that point where message playback was stopped to enable subsequent continuation of playback from such point.*

*14. A telephone answering machine connected to a telephone line and having (a) a telephone portion including a telephone handset with means for communication between called and calling parties when the handset is off hook, (b) an answering portion including means for message recording and playback, and (c) speaker means to audibly reproduce a recorded message on said message recording and playback means, comprising:*

*switching means for (a) selectively coupling the message recording and playback means to either one of said telephone handset and said speaker means at any given time, and (b) selectively coupling the handset to the telephone line;*

*ring detect means for sensing an incoming ring on said telephone line and for generating a ring detect signal in response thereto;*

*control means for, when audible reproduction by one of the speaker means and handset of a message recorded by said message recording and playback means is in progress, (a) actuating said switching means to couple the handset to said telephone line after occurrence of said ring detect signal, and (b) stopping playback of the recorded message when the switching means is actuated in response to said ring detect signal.*

*15. The telephone answering machine of claim 14, wherein said control means pauses said message recording and playback means at that point where message playback was stopped to enable subsequent continuation of playback from such point.*

*16. The telephone answering machine of claim 14, wherein when audible reproduction by the handset of a message recorded by said message recording and playback means is in progress, said control means stops playback of the recorded message in response to said ring detect signal and a flash signal.*

*17. The telephone answering machine of claim 14, wherein when audible reproduction by the speaker means of a message recorded by said message recording and playback means is in progress, said control means stops playback of a recorded message in response to said ring detect signal and the handset going off hook.*

* * * * *